(12) United States Patent
Chen

(10) Patent No.: US 11,764,682 B2
(45) Date of Patent: Sep. 19, 2023

(54) BUCK CONVERTER WITH QUICK RESPONSE MECHANISM AND METHOD THEREOF

(71) Applicant: RICHTEK TECHNOLOGY CORP., Hsinchu County (TW)

(72) Inventor: Yung-Jen Chen, Kaohsiung (TW)

(73) Assignee: RICHTEK TECHNOLOGY CORP., Hsinchu County (TW)

( * ) Notice: Subject to any disclaimer, the term of this patent is extended or adjusted under 35 U.S.C. 154(b) by 86 days.

(21) Appl. No.: 17/684,393

(22) Filed: Mar. 1, 2022

(65) Prior Publication Data

US 2023/0127211 A1    Apr. 27, 2023

Related U.S. Application Data

(60) Provisional application No. 63/271,209, filed on Oct. 24, 2021.

(30) Foreign Application Priority Data

Dec. 24, 2021  (TW) ................................. 110148641

(51) Int. Cl.
*H02M 3/158* (2006.01)
*H02M 1/00* (2006.01)
*H02M 1/32* (2007.01)

(52) U.S. Cl.
CPC ....... *H02M 3/1586* (2021.05); *H02M 1/0003* (2021.05); *H02M 1/0016* (2021.05);
(Continued)

(58) Field of Classification Search
CPC ............ H02M 1/0003; H02M 1/0016; H02M 1/0022; H02M 1/0025; H02M 1/32; H02M 3/156; H02M 3/158; H02M 3/1582; H02M 3/1584; H02M 3/1586; H02M 3/335; H02M 3/33571
See application file for complete search history.

(56) References Cited

U.S. PATENT DOCUMENTS 8,159,805 B2 *  4/2012  Feng ..................... H02M 3/156
                                             361/111
10,439,497 B2 * 10/2019  Wu ........................ H02M 3/158
(Continued)

*Primary Examiner* — Thienvu V Tran
*Assistant Examiner* — Shahzeb K Ahmad
(74) *Attorney, Agent, or Firm* — Winston Hsu

(57) ABSTRACT

A buck converter includes a quick response circuit, a compensator coupled to an output node, an interleaving logic circuit coupled to the compensator, a plurality of on-time generators, a plurality of OR gates coupled to the corresponding on-time generator, a plurality of power stages coupled to the corresponding OR gates, a plurality of inductors and an output capacitor. Each on-time generator is coupled to the interleaving logic circuit, an input node and the output node. The quick response circuit includes a voltage droop sensor coupled to the output node, a load frequency sensor coupled to the output node, a quick response signal generator coupled to the voltage droop sensor, a maximum quick response signal generator coupled to the voltage droop sensor and the load frequency sensor, an AND gate coupled to the quick response signal generator, the maximum quick response signal generator and the plurality of OR gates.

20 Claims, 10 Drawing Sheets

(52) U.S. Cl.
CPC ............. *H02M 1/32* (2013.01); *H02M 3/158* (2013.01); *H02M 3/1582* (2013.01)

(56) References Cited

U.S. PATENT DOCUMENTS

| | | | |
|---|---|---|---|
| 2014/0176097 A1* | 6/2014 | Huang | G05F 1/59 323/272 |
| 2014/0253079 A1* | 9/2014 | Ding | H02M 3/156 323/283 |
| 2014/0292291 A1* | 10/2014 | Lee | H02M 3/1584 323/271 |
| 2019/0207518 A1* | 7/2019 | Wu | G01R 29/033 |
| 2020/0228012 A1* | 7/2020 | Lynch | H02M 3/158 |
| 2022/0337161 A1* | 10/2022 | Hsiao | H02M 1/14 |

* cited by examiner

BUCK CONVERTER WITH QUICK RESPONSE MECHANISM AND METHOD THEREOF

CROSS REFERENCE TO RELATED APPLICATIONS

This application claims the benefit of U.S. Provisional Application No. 63/271,209, filed on Oct. 24, 2021. The content of the application is incorporated herein by reference.

BACKGROUND OF THE INVENTION

1. Field of the Invention

The present invention is related to a buck converter and more particularly to a buck converter with quick response mechanism and its operating method.

2. Description of the Prior Art

In voltage regulation application in microprocessor core voltage control, multiphase control is commonly used to satisfy the requirement of high power density and high current slew rate. However, conventional multiphase control is still insufficient to handle the ultra-high load transient of modern voltage regulator specifications. A quick response open-loop control mechanism was invented to overcome the undershoot problem. During the load application transient, the quick response mechanism can immediately turn on all phases of the high side switches to fully supply the demand for large load current. The output voltage droop can thus be controlled within the load line specification. Even so, the quick response mechanism still comes with some disadvantages. For example, inaccurate timing of turning on and off the switches in the conventional quick response mechanism may cause unexpected ringback or continuous output voltage rise resulting in overvoltage.

FIG. 9 illustrates a conventional buck converter 900 with a quick response circuit. The buck converter 900 includes a plurality of on-time generators Ton1 to TonN, a plurality of OR gates OR1 to ORN, a plurality of power stages PS1 to PSN, a plurality of inductors L1 to LN, an output capacitor Co, a load Lo, and a quick response (QR) circuit 910. The OR gates OR1 to ORN are coupled to the corresponding on-time generators Ton1 to TonN. The power stages PS1 to PSN are coupled to the corresponding OR gates OR1 to ORN. The inductors L1 to LN are coupled between the corresponding power stages PS1 to PSN and an output terminal OUT. The output capacitor Co is coupled between the output terminal OUT and the ground terminals GND. The load Lo is coupled between the output terminals OUT and the ground terminals GND. The quick response circuit 910 is coupled between the output terminal OUT and the OR gates OR1 to ORN. Each power stage, such as power stage PS1, includes a buffer 903, an inverter 904, a first transistor 901 and a second transistor 902. The buffer 903 is coupled to the OR gate OR1. The inverter 904 is coupled to the OR gate OR1. The first transistor 901 includes a first terminal for receiving the input voltage Vin, a second terminal coupled to the inductor L1, and a control terminal coupled to the buffer 903. The second transistor 902 includes a first terminal coupled to the second terminal of the first transistor 901 and the inductor L1, a second terminal coupled to the ground terminal GND, and a control terminal coupled to the inverter 904. The quick response signal circuit 910 generates a quick response signal QR according to an output voltage Vo. The on-time generators Ton1 to TonN of each phase output on-time signals PM1 to PMN according to an input voltage Vin and the output voltage Vo. The OR gates OR1 to ORN generate PWM (pulse width modulation) signals PWM1 to PWMN of each phase according to the on-time signals PM1 to PMN and the quick response signal QR. The PWM signals PWM1 to PWMN drive the power stages PS1 to PSN to provide the output voltage Vo and the load current $I_{Lo}$.

FIG. 10 is a timing diagram of operation signals of the buck converter 900 of FIG. 9. At time t1, when the power demand of the load Lo increases, the load current $I_{Lo}$ rises to the high level, and the output voltage Vo drops below the threshold. At this time, the quick response circuit 910 can generate the quick response signal QR. The quick response signal QR and the on-time signals PM1 to PMN pass through the OR gates to generate the PWM signals PWM1 to PWMN, which are used to drive the power stages PS1 to PSN to provide output voltage Vo and load current $I_{Lo}$. In more detail, the leading edge of the quick response signal QR can turn on the first transistor 901 and turn off the second transistor 902, so the load current $I_{Lo}$ is provided through the first terminal of the first transistor 901 to the load Lo. After the first transistor 901 is turned on, the inductors L1 to LN begin to charge, and the total inductor current Isum increases. At the same time period, part of the current flows to the output capacitor Co, and the other part flows to the load Lo for providing power. After the quick response signal QR is pulled to the low level, the first transistor 901 is turned off and the second transistor 902 is turned on; the inductor L begins to discharge. As the total inductor current Isum decreases, the current can flow out of the output capacitor Co to the load Lo, maintaining the load current $I_{Lo}$ at the high level. At time t2, while the total inductor current Isum continues to drop, the load current $I_{Lo}$ drops to the low level causing the output voltage Vo to rise.

At time t3, the load current $I_{Lo}$ rises to the high level again, causing the output voltage Vo to drop below the threshold. At this time period, the quick response signal QR is generated again and pushes the power stages PS1 to PSN to provide the output voltage Vo and the load current $I_{Lo}$. At time t4, the load current $I_{Lo}$ drops to the low current again, the output voltage Vo starts to rise. The rest of the operation process during time t3 to t5 is similar to the process during time t1 to t3. Between time t5 and t6, the entire circuit operation process between time t3 and t4 is repeated. However, the load frequency during time t3 to t6 is higher than the load frequency during time t1 to t3, and the total inductor current Isum and the output voltage Vo would be pulled high again before falling back to the original level. The total inductor current Isum and the output voltage Vo would rise higher and higher over time, and eventually result in overvoltage of the circuit.

SUMMARY OF THE INVENTION

The embodiment provide a buck converter including a quick response circuit, a compensator, an interleaving logic circuit, a plurality of on-time generators, a plurality of OR gates, a plurality of power stages and a plurality of inductors. The quick response circuit includes a voltage droop sensor, a load frequency sensor, a quick response signal generator, a maximum quick response signal generator, and an AND gate. The voltage droop sensor is coupled to an output terminal, for detecting a voltage droop of an output voltage and generating a trigger signal accordingly. The load frequency sensor is coupled to the output terminal, for detecting a frequency of a load and output a load frequency signal accordingly. The quick response signal generator is coupled to the voltage droop sensor, for generating an initial quick response signal according to the trigger signal. The maximum quick response signal generator is coupled to the voltage droop sensor, the load frequency sensor, the output terminal and an input terminal, for generating a maximum quick response signal according to an input voltage, the trigger signal, the load frequency signal and the output voltage. The AND gate is coupled to the quick response signal generator and the maximum quick response signal generator, for generating a quick response signal according to the initial quick response signal and the maximum quick response signal. The compensator is coupled to the output terminal, for generating a compensator signal according to the output voltage and a reference voltage. The interleaving logic circuit is coupled to the compensator, for generating an interleaving signal according to the compensator signal. Each of the on-time generators is coupled to the interleaving logic circuit, the input terminal and the output terminal, for generating an on-time signal according to the interleaving signal, the output voltage and the input voltage. Each of the OR gates is coupled to the AND gate of the quick response circuit and a corresponding on-time generator, for generating a PWM (pulse width modulation) signal according to the quick response signal and a corresponding on-time signal. Each of the power stages is coupled to a corresponding OR gate, for generating the output voltage according to a plurality of PWM signals generated by the plurality of OR gates. Each of the inductors is coupled between a corresponding power stage and the output terminal. The output capacitor is coupled between the output terminal and a ground terminal.

The embodiment provides a method of operating a buck converter. The buck converter includes a quick response circuit, a compensator, an interleaving logic circuit, a plurality of on-time generators, a plurality of OR gates, a plurality of power stages, a plurality of inductors and an output capacitor. The compensator is coupled to an output terminal. The interleaving logic circuit is coupled to the compensator. Each of the on-time generators is coupled to the interleaving logic circuit, an input terminal and the output terminal. Each of the OR gates is coupled to a corresponding on-time generator. Each of the power stages is coupled to the corresponding the plurality of OR gates. Each of the inductors is coupled between a corresponding power stage and the output terminal. The output capacitor is coupled between the output terminal and a ground terminal. The quick response circuit includes a voltage droop sensor, a load frequency sensor, a quick response signal generator, a maximum quick response signal generator, and an AND gate. The voltage droop sensor is coupled to the output terminal. The load frequency sensor is coupled to the output terminal. The quick response signal generator is coupled to the voltage droop sensor. The maximum quick response generator is coupled to the voltage droop sensor, the load frequency sensor, the output terminal and the input terminal. The AND gate is coupled to the quick response signal generator, the maximum quick response signal generator and the plurality of OR gates. The method includes the voltage droop sensor generating a trigger signal according to a voltage droop of an output voltage, the load frequency sensor outputting a load frequency signal according to a frequency of a load, the quick response signal generator generating an initial quick response signal according to the trigger signal, the maximum quick response signal generator generating a maximum quick response signal according to an input voltage, the trigger signal, the load frequency signal and the output voltage, the AND gate generating a quick response signal according to the initial quick response signal and the maximum quick response signal, the compensator generating a compensator signal according to the output voltage and a reference voltage, the interleaving logic circuit generating an interleaving signal according to the compensator signal, each of the plurality of on-time generators generating an on-time signal according to the interleaving signal, the output voltage and the input voltage, each of the plurality of OR gates generating a PWM signal according to the quick response signal and a corresponding on-time signal, and the plurality of power stages generating the output voltage according to a plurality of PWM signals generated by the plurality of OR gates.

The embodiment provides a maximum quick response signal generator including a current source, a capacitor, a switch, a comparator and a flip-flop. The current source is for generating a current according to an input voltage and a load frequency signal. T capacitor is coupled between the current source and a ground terminal. The switch includes a first terminal coupled to the current source and the capacitor, a second terminal coupled to the ground terminal, and a control terminal. The comparator is for generating a reset signal according to a response voltage and an output voltage. The comparator includes a positive terminal coupled to the current source, the capacitor and the first terminal of the switch, for receiving the response voltage, a negative terminal for receiving the output voltage, and an output terminal for outputting the reset signal. The flip-flop is for generating a maximum quick response signal according to a fixed voltage, a trigger signal and the reset signal. The flip-flop includes a data terminal for receiving the fixed voltage, a reset terminal coupled to the output terminal of the comparator, for receiving the reset signal, a clock terminal for receiving the trigger signal, an output terminal for outputting the maximum quick response signal, and an inverse output terminal coupled to the control terminal of the switch.

The embodiment provides a method of operating a maximum quick response signal generator. The maximum quick response signal generator includes a current source, a capacitor, a switch, a comparator and a flip-flop. The capacitor is coupled between the current source and a ground terminal. The switch includes a first terminal coupled to the current source and the capacitor, a second terminal coupled to the ground terminal, and a control terminal. The comparator includes a positive terminal coupled to the current source, the capacitor and the first terminal of the switch, a negative terminal and an output terminal. The flip-flop includes a data terminal, a reset terminal coupled to the output terminal of the comparator, a clock terminal, an output terminal and an inverse output terminal coupled to the control terminal of the switch. The method includes the current source generating a current according to an input voltage and a load frequency signal, the comparator outputting a reset signal at the output terminal of the comparator according to a response voltage received by the positive terminal and an output voltage received by the negative terminal, and the flip-flop outputting the maximum quick response signal at the output terminal of the flip-flop according to a fixed voltage received by the data terminal, a trigger signal received by the clock terminal, and the reset signal received by the reset terminal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
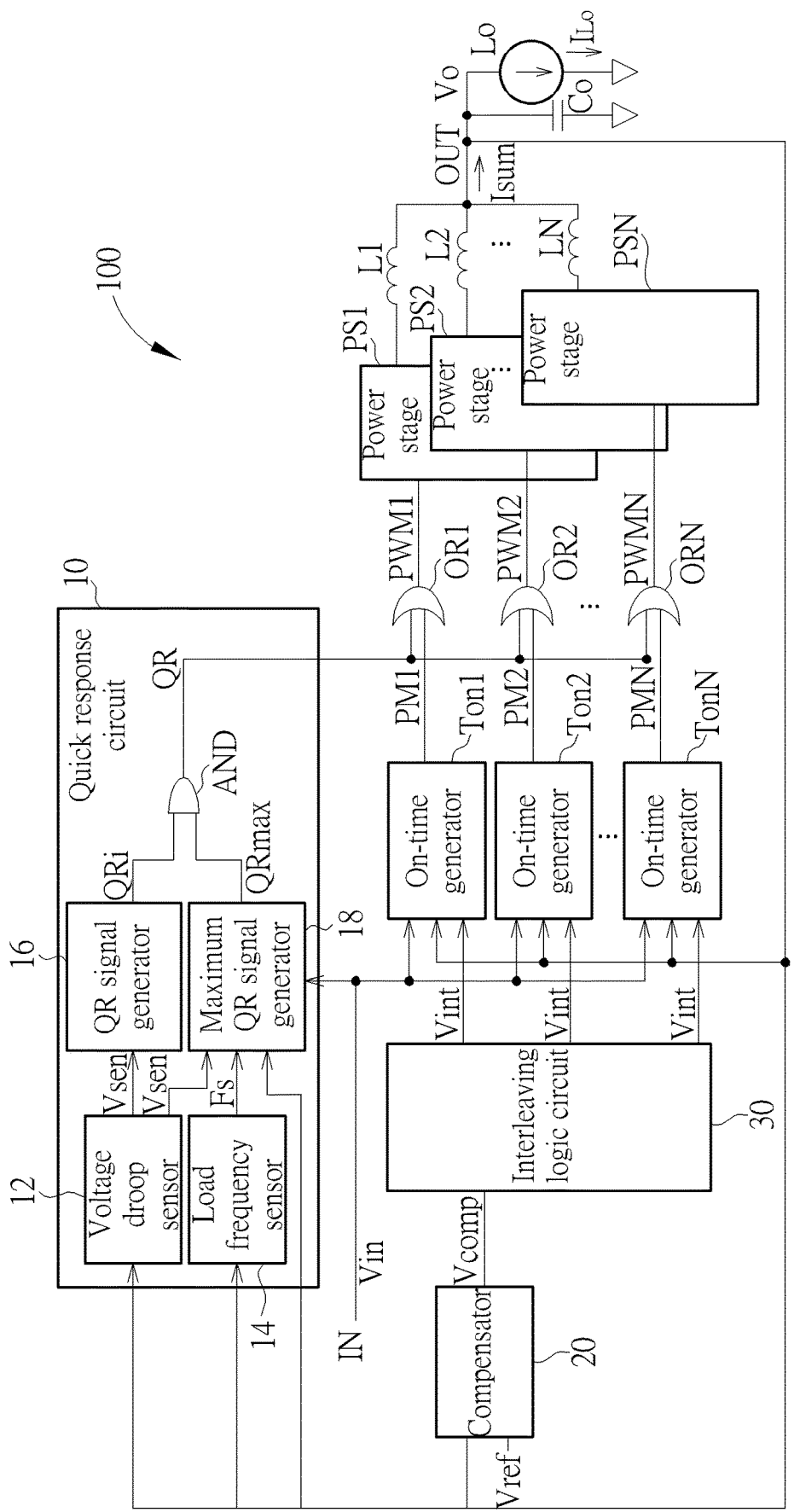
FIG. 1 is a diagram of a buck converter of an embodiment of the present invention.

FIG. 1 is a diagram of a buck converter 100 of an embodiment of the present invention. The buck converter 100 is a DC-DC converter that can reduce voltage, so the voltage at the output terminal OUT is lower than the input voltage Vin at the input terminal IN. The buck converter 100 may include a quick response (QR) circuit 10, a compensator 20, an interleaving logic circuit 30, a plurality of on-time generators Ton1 to TonN, a plurality of OR gates OR1 to ORN, a plurality of power stages PS1 to PSN, a plurality of inductors L1 to LN, an output capacitor Co and a load Lo. The compensator 20 is coupled to the output terminal OUT. The interleaving logic circuit 30 is coupled to the compensator 20. The on-time generators Ton1 to TonN are coupled to the interleaving logic circuit 30, the input terminal IN and the output terminal OUT. The OR gates OR1 to ORN are coupled to the corresponding on-time generators Ton1 to TonN. The power stages PS1 to PSN are coupled to the corresponding OR gates OR1 to ORN. The inductors L1 to LN are coupled between the corresponding power stages PS1 to PSN and the output terminal OUT. The output capacitor Co is coupled between the output terminal OUT and the ground terminal GND. The load Lo is also coupled between the output terminal OUT and the ground terminal GND. Each on-time generator and each power stage correspond to a phase. For example, the on-time generator Ton1 and the power stage PS1 correspond to the 1st phase, and the on-time generator Ton2 and the power stage PS2 correspond to the 2nd phase, and so forth.

The quick response circuit 10 includes a voltage droop sensor 12, a load frequency sensor 14, a quick response signal generator 16, a maximum quick response signal generator 18, and an AND gate AND. The voltage droop sensor 12 and the load frequency sensor 14 are coupled to the output terminal OUT. The quick response signal generator 16 is coupled to the voltage droop sensor 12. The maximum quick response signal generator 18 is coupled to the voltage droop sensor 12, the load frequency sensor 14, the input terminal IN and the output terminal OUT. The AND gate AND is coupled to the quick response signal generator 16, the maximum quick response signal generator 18 and the OR gates OR1 to ORN.

The voltage droop sensor 12 is for generating the trigger signal Vsen according to the voltage droop of the output voltage Vo. The load frequency sensor 14 is for outputting the load frequency signal Fs according to the frequency of the load Lo. The quick response signal generator 16 is for generating an initial quick response signal QR1 according to the trigger signal Vsen. The maximum quick response signal generator 18 is for generating the maximum quick response signal QRmax according to the input voltage Vin, the trigger signal Vsen, the load frequency signal Fs and the output voltage Vo. The AND gate AND is for generating the quick response signal QR according to the initial quick response signal QR1 and the maximum quick response signal QRmax. The compensator 30 is for generating the compensator signal Vcomp according to the output voltage Vo and the reference voltage Vref. The interleaving logic circuit 30 is for generating the interleaving signal Vint according to the compensator signal Vcomp. The on-time generators Ton1 to TonN are for generating on-time signals PM1 to PMN according to the interleaving signal Vint, the output voltage Vo and the input voltage Vin. The OR gates OR1 to ORN are for generating the PWM signals PWM1 to PWMN according to the quick response signal QR and the corresponding on-time signals PM1 to PMN. The power stages PS1 to PSN are for generating the output voltage Vo and providing the load current $I_{Lo}$ to the load Lo according to the PWM signals PWM1 to PWMN, and generating the total inductor current Isum at the inductors L1 to LN. The on-time signals PM1 to PMN and the PWM signals PWM1 to PWMN correspond respectively to different phases.

For example, the frequency range of the load Lo of the buck converter 100 may be between 300 Hz and 1 MHz. The input voltage Vin may be between 6V and 24V. The output voltage Vo may be between 0.2V and 3.05V. The quick response signal QR may be 5V, and the load current $I_{Lo}$ may be between 50 A and 300 A.

Figure 2:
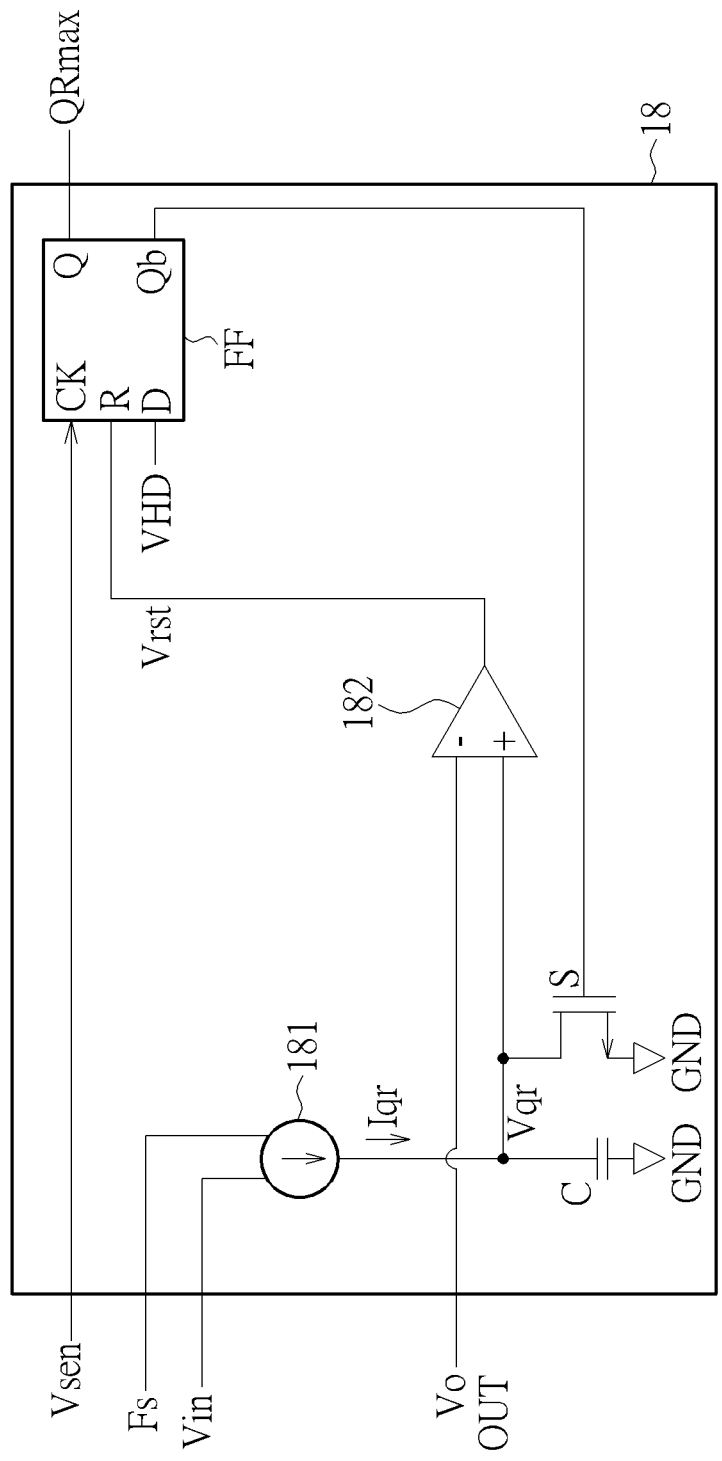
FIG. 2 is a diagram of the maximum quick response signal generator of FIG. 1.

FIG. 2 is a diagram of the maximum quick response signal generator 18 of FIG. 1. The maximum quick response signal generator 18 includes a current source 181, a capacitor C, a switch S, a comparator 182 and a flip-flop FF. The capacitor C is coupled between the current source 181 and the ground terminal GND. The switch S includes a first terminal coupled to the current source 181 and the capacitor C, a second terminal coupled to the ground terminal GND, and a control terminal. The comparator 182 includes a positive terminal coupled to the current source 181, the capacitor C and the first terminal of the switch S, and a negative terminal coupled to the output terminal OUT. The flip-flop FF includes a data terminal D, a reset terminal R coupled to the output terminal of the comparator 182, a clock terminal CK, an output terminal Q, and the inverse output terminal Qb coupled to the control terminal of the switch S. The current source 181 is for generating the response current Iqr according to the input voltage Vin and the load frequency signal Fs. The comparator 182 is for generating the reset signal Vrst according to the response voltage Vqr received by the positive terminal and the output voltage Vo received by the negative terminal. The flip-flop FF is for outputting the maximum quick response signal QRmax at the output terminal Q according to a fixed voltage VHD received by the data terminal D, the trigger signal Vsen received by the clock terminal CK, and the reset signal Vrst received by the reset terminal R. The current source 181 can be implemented by any semiconductor current mirror, and the switch S can be implemented by a field-effect transistor.

Figure 3:
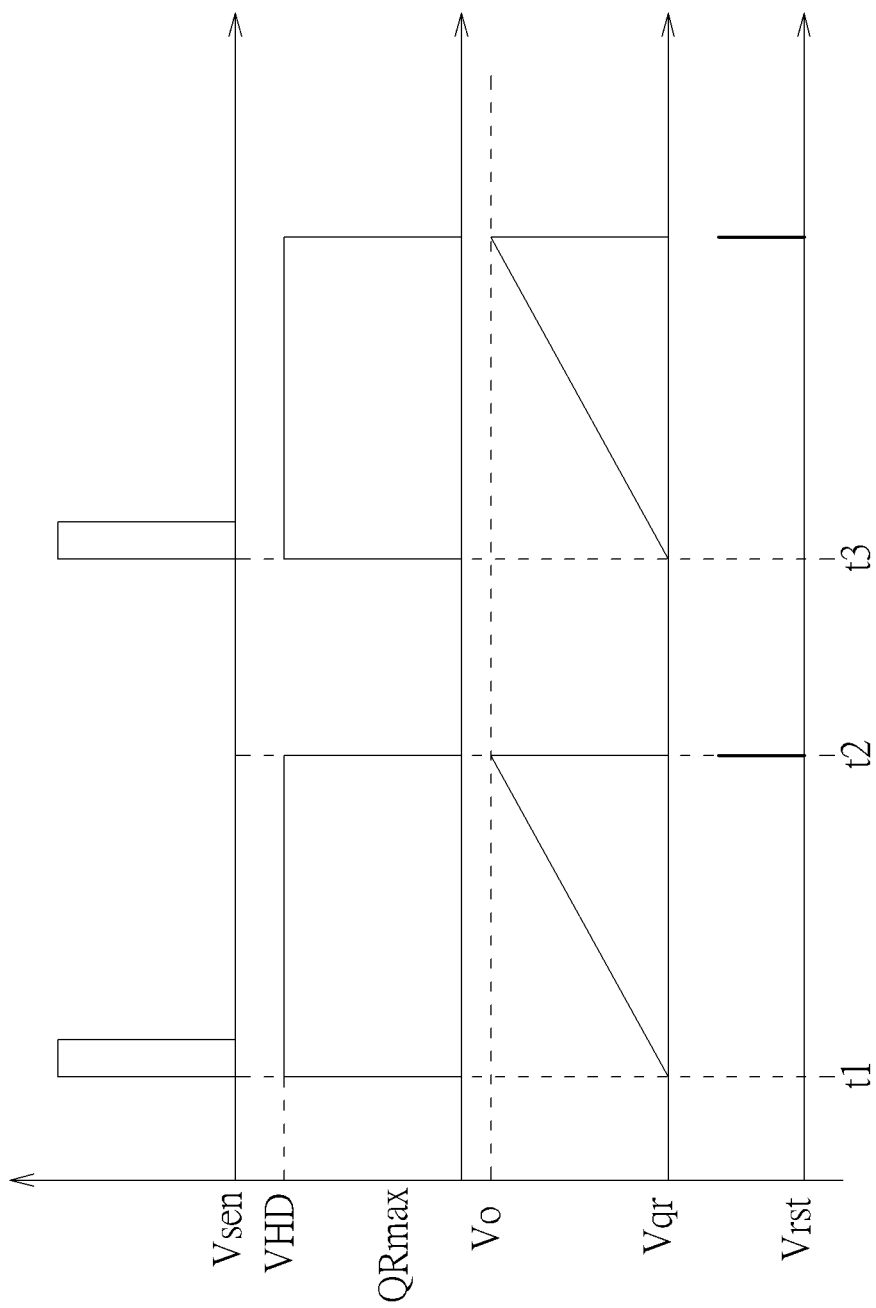
FIG. 3 is a timing diagram of the operation signals of the maximum quick response signal generator in FIG. 2.

FIG. 3 is a timing diagram of the operation signals of the maximum quick response signal generator 18 in FIG. 2. The operation process of generating the maximum quick response signal QRmax by the maximum quick response signal generator 18 is as follows. At time t1, the trigger signal Vsen is pulled to the high level, so that the maximum quick response signal QRmax output by the output terminal Q of the flip-flop FF is also pulled to the high level. The response current Iqr begins to charge the capacitor C, causing the response voltage Vqr begins to rise. At time t2, when the response voltage Vqr rises to a level exceeding the output voltage Vo, the comparator 182 pulls the reset signal Vrst to the high level. The reset signal at the high level Vrst pulls the maximum quick response signal QRmax to the low level, and pulls the signal output from the inverse output terminal Qb to the high level causing the switch S to turn on. The response current Iqr then flows to the ground terminal GND, which pulls the response voltage Vqr to the low level, and the reset signal Vrst also returns to the low level. Because the circuit response time is in the nanosecond range, the reset signal Vrst can look like a pulse signal. At time t3, the trigger signal Vsen is pulled to the high level again, and the entire circuit operation process is repeated. The same description for the process is not repeated herein for the sake of brevity.

The entire circuit operation process can be repeated as long as needed. The width (or on-time) of the maximum quick response signal QRmax is the time required for the response voltage Vqr to rise from the low level to the level of the output voltage Vo. It should be noted that the variation amplitude of the output voltage Vo is much less than the response voltage Vqr, so the level of the output voltage Vo appears to be fixed in FIG. 3.

Furthermore, the current source 181 can adjust the response current Iqr according to the load frequency signal Fs and the input voltage Vin. The fixed voltage VHD can be a DC voltage, such as 5V. It can be applied to make the high level of the maximum quick response signal QRmax equal to the level of fixed voltage VHD. The width of the maximum quick response signal QRmax can be expressed by the following equation:

$$QR_{max} = C \frac{V_o}{\frac{V_{in}}{R_s} F_s}$$

QRmax is the width of the maximum quick response signal. C is the capacitance value of the capacitor. Vo is the output voltage. Vin is the input voltage. Rs is the resistance value of the current source 181. Fs is the load frequency.

The width of the maximum quick response signal QRmax is the maximum width of the PWM signal that the buck converter 100 can receive. If the width of the PWM signal exceeds this width, the output voltage Vo would continue to rise, resulting in overvoltage. The application of the maximum quick response signal generator 18 can effectively avoid this situation.

Figure 4:
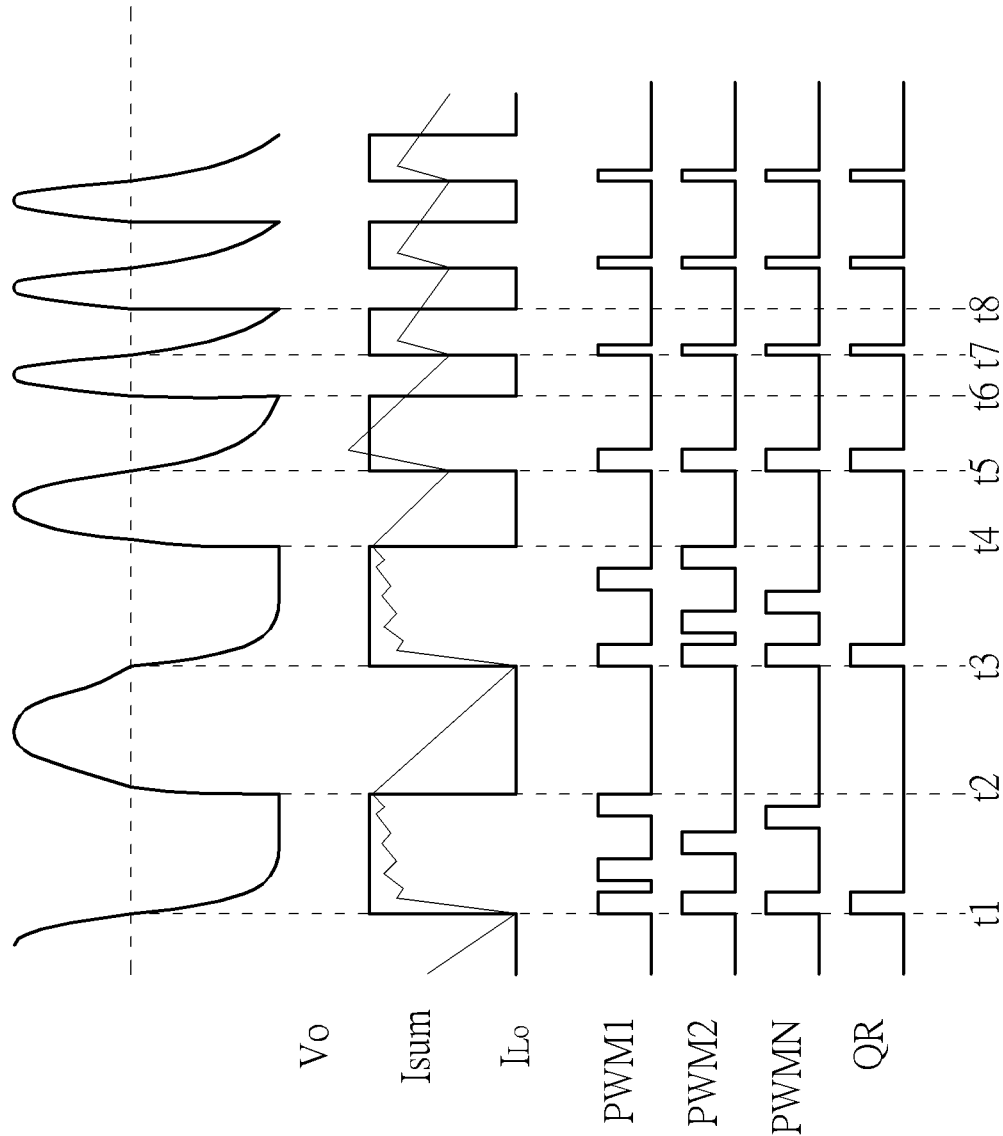
FIG. 4 is a timing diagram of the operation signals of the buck converter of FIG. 1.

FIG. 4 is a timing diagram of the operation signals of the buck converter 100 of FIG. 1. The process of generating the quick response signal QR and applying it to the buck converter 100 to provide the output voltage Vo and the load current $I_{Lo}$ is described as follows.

At time t1, the load current $I_{Lo}$ rises to the high level, causing the output voltage Vo to drop below the threshold. At this time, the voltage droop sensor 12 would generate the trigger signal Vsen, and send the trigger signal Vsen to the quick response signal generator 16 and the maximum quick response signal generator 18 to respectively generate the initial quick response signal QR1 and the maximum quick response signal QRmax. The quick response signal generator 16 can adjust the width of the initial quick response signal QR1 according to the slope of the trigger signal Vsen. The initial quick response signal QR1 and the maximum quick response signal QRmax are sent to the AND gate AND. The AND gate AND performs AND logic operation on the maximum quick response signal QRmax and the initial quick response signal QR1 to generate the quick response signal QR. The quick response signal QR and the on-time signals PM1 to PMN are respectively input to the corresponding OR gates OR1 to ORN. The OR gates OR1 to ORN perform OR logic operation on the quick response signal QR and the corresponding on-time signals PM1 to PMN to generate the PWM signals PWM1 to PWMN. The PWM signals PWM1 to PWMN can simultaneously drive the power stages PS1 to PSN to generate the output voltage Vo. The total inductor current Isum generated by the inductors L1 to LN would also start to increase. Meanwhile, part of the total inductor current Isum flows to the output capacitor Co to charge the output capacitor Co, and the other part of the current becomes the load current $I_{Lo}$ to the load Lo, providing the power required by the load Lo.

During times t1 to t2, initially the quick response signal QR provides power, so that the total inductor current Isum can be quickly pulled up. At this time period, because the output voltage Vo is still less than the threshold, the compensator 20 outputs the compensator signal Vcomp to make the interleaving logic circuit 30 generate the interleaving signal Vint to push the on-time generators Ton1 to TonN to generate the on-time signals PM1 to PMN interleavingly or sequentially. At this time, the on-time signals PM1 to PMN are substantially the PWM signals PWM1 to PWMN. The PWM signals PWM1 to PWMN drive the power stages PS1 to PSN to supply a part of the load current $I_{Lo}$. Also, the output capacitor Co can discharge to provide the other part of the load current $I_{Lo}$.

At time t2, the load current $I_{Lo}$ drops to the low level, and the output voltage Vo begins to rise. The inductors L1 to LN begin to discharge, so the total inductor current Isum begins to drop to the low level until time t3. The load current $I_{Lo}$ increases again at time t3. The circuit operation process during times t3 to t4 is similar to the operation process during times t1 to t2, and the circuit operation process during times t2 to t3 is similar to the operation process during times t4 to t5. The description is not repeated herein for the sake of brevity.

During times t5 to t7, the load frequency increases. The quick response signal QR is substantially the PWM signals PWM1 to PWMN. The PWM signals PWM1 to PWMN simultaneously drive the power stages PS1 to PSN to generate the output voltage Vo and provide the load current $I_{Lo}$. Since the PWM signals PWM1 to PWMN generated by the quick response signal QR have already provided sufficient power, the compensator 20 would not need to output the compensator signal Vcomp to make the on-time generators Ton1 to TonN to output the on-time signals PM1 to PMN to drive the power stages PS1 to PSN to provide additional current. After the quick response signal QR is pulled to the low level, the inductors L1 to LN begin to discharge, and the total inductor current Isum begins to decrease. After that, the load current $I_{Lo}$ drops to the low level at time t6. Then, the output voltage Vo starts to increase, and the total inductor current Isum continues to decrease until time t7. The load current $I_{Lo}$ increases again at time t7.

Although the frequency of the operation from time t7 to t8 and the following cycles may be different, the operation process is basically the same. Because the quick response circuit 10 can control the width of the quick response signal QR, the total inductor current Isum can be pulled up again after it drops back to the original level, so there is not additional energy accumulated. Thus, the output voltage Vo would not rise higher and higher over time, so as to avoid overvoltage causing error in the circuit.

Figure 5:
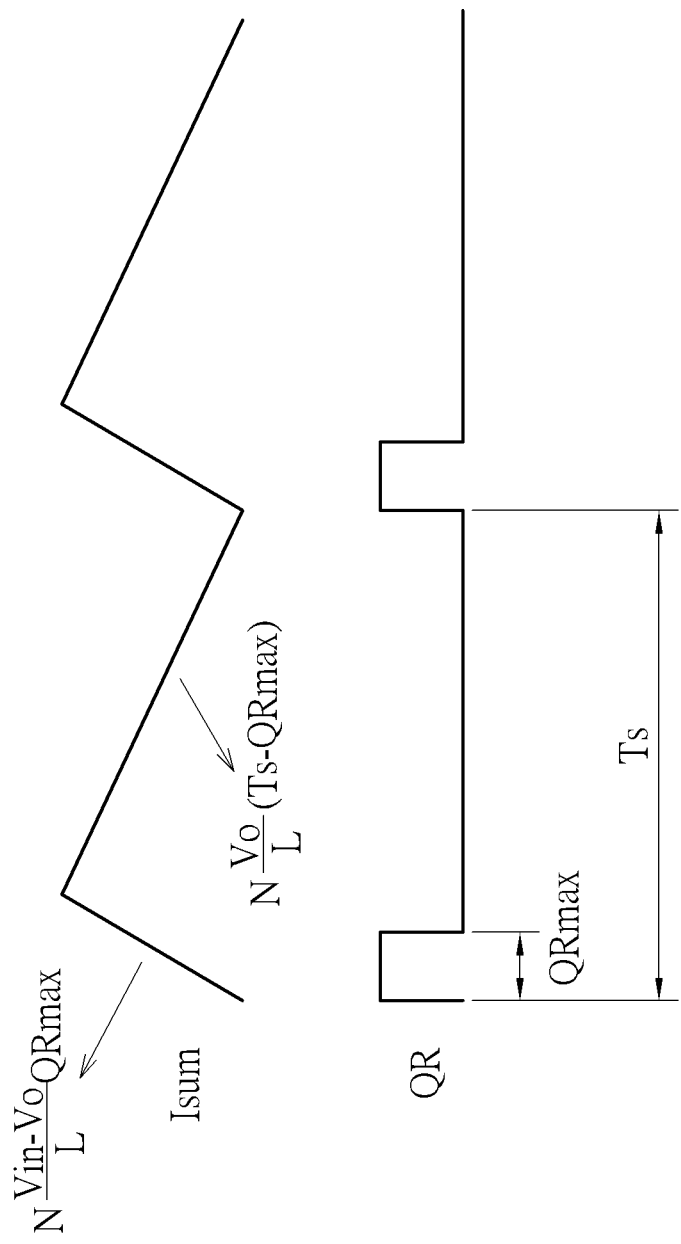
FIG. 5 is another timing diagram of the operation signals of the buck converter of FIG. 1.

FIG. 5 is another timing diagram of the operation signals of the buck converter 100 of FIG. 1. FIG. 5 illustrates the total inductor current Isum and the quick response signal QR to help explain how to derive the width of the maximum quick response signal QRmax. The description is as follows:

The total electrical energy charged to the inductors L1 to LN in one cycle is:

$$N \frac{Vin - Vo}{L} QR_{max}$$

The total electrical energy discharged from the inductors L1 to LN in one cycle is:

$$N \frac{Vo}{L} (T_s - QR_{max})$$

According to the law of conservation of energy, the total electrical energy charged to the inductors L1 to LN is equal to the total electrical energy discharged from the inductors L1 to LN:

$$N \frac{Vin - Vo}{L} QR_{max} = N \frac{Vo}{L} (T_s - QR_{max})$$

Therefore, the maximum width of the PWM signal that the buck converter 100 can receive can be derived from the following equation:

$$N \frac{Vin - Vo}{L} QR_{max} = N \frac{Vo}{L} (T_s - QR_{max})$$

$$\frac{QR_{max}}{T_s - QR_{max}} = \frac{Vo}{Vin - Vo}$$

$$\frac{\frac{QR_{max}}{T_s}}{1 - \frac{QR_{max}}{T_s}} = \frac{\frac{Vo}{Vin}}{1 - \frac{Vo}{Vin}}$$

$$\frac{QR_{max}}{T_s} = \frac{Vo}{Vin}$$

$$QR_{max} = \frac{Vo}{Vin} \frac{1}{F_s}$$

QRmax is the width of the maximum quick response signal. Vo is the output voltage. Vin is the input voltage. Fs is the load frequency. Ts is the load period. N is the number of phases. L is the inductance value of the inductors. It can be seen from the equations that the width of the maximum quick response signal can be determined according to the input voltage Vin, the output voltage Vo, and the load frequency Fs.

Figure 6:
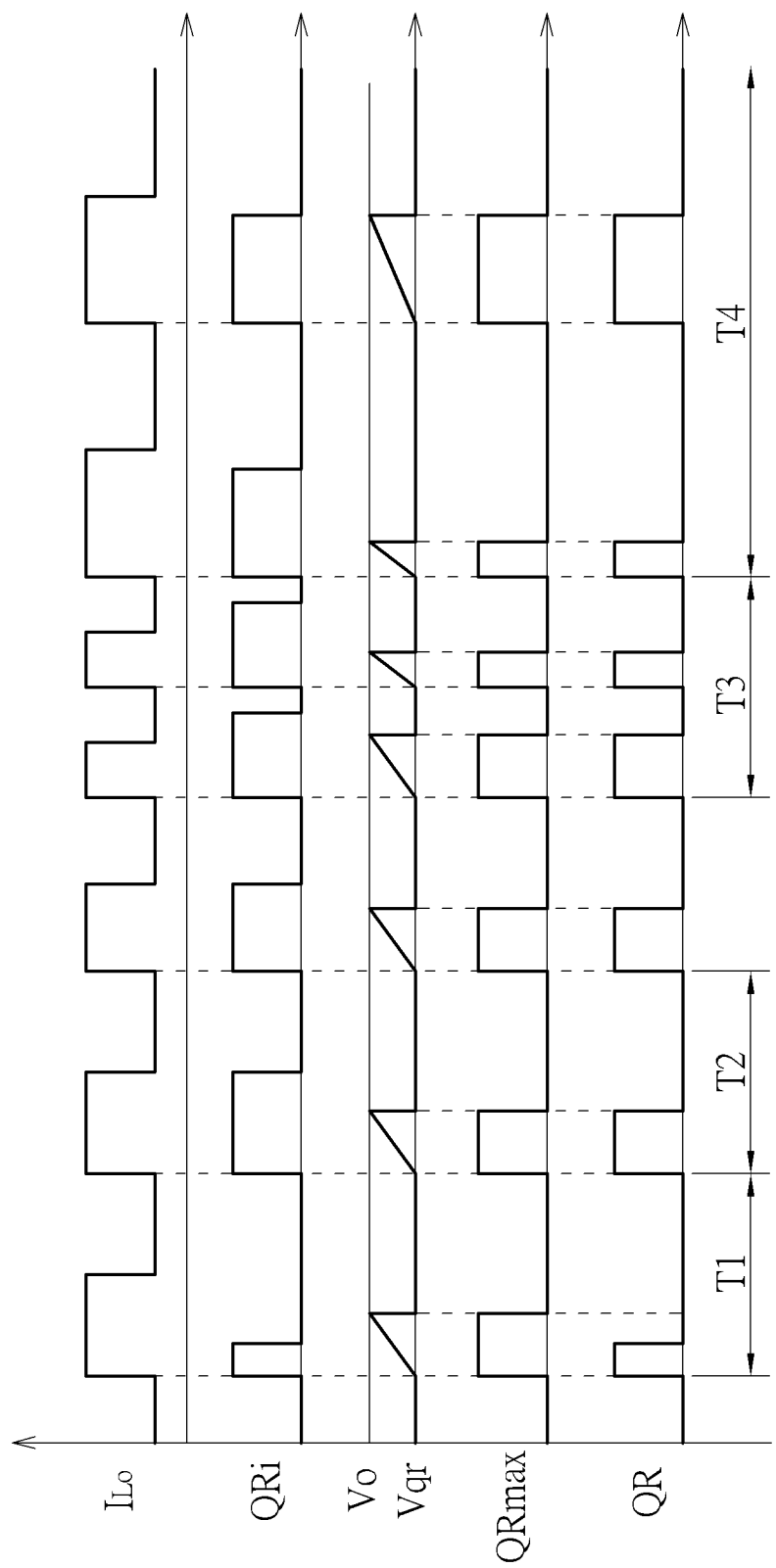
FIG. 6 is another timing diagram of the operation signals of the buck converter of FIG. 1.

FIG. 6 is another timing diagram of the operation signals of the buck converter 100 of FIG. 1. The width (or on-time) of the maximum quick response signal QRmax is the time required for the response voltage Vqr to rise from the low level to the output voltage Vo. In time period T1, the width of the initial quick response signal QR1 is less than the width of the maximum quick response signal QRmax, so the quick response signal QR output by the quick response circuit 10 may be the initial quick response signal QR1. In time period T2, the width of the initial quick response signal QR1 is greater than the width of the maximum quick response signal QRmax, so the quick response signal QR output by the quick response circuit 10 may be the maximum quick response signal QRmax. In time period T3, when the load frequency Fs increases, the maximum quick response signal generator 18 reduces the width of the maximum quick response signal QRmax. Therefore, the quick response signal QR output by the quick response circuit 10 may be the maximum quick response signal QRmax. In time period T4, when the load frequency Fs decreases, and the maximum quick response signal generator 18 increases the width of the maximum quick response signal QRmax. Therefore, the quick response signal QR output by the quick response circuit 10 may be the initial quick response signal QR1. By this method, the width of the quick response signal QR can be adjusted promptly according to the load frequency Fs to avoid overvoltage and improve energy efficiency.

Figure 7:
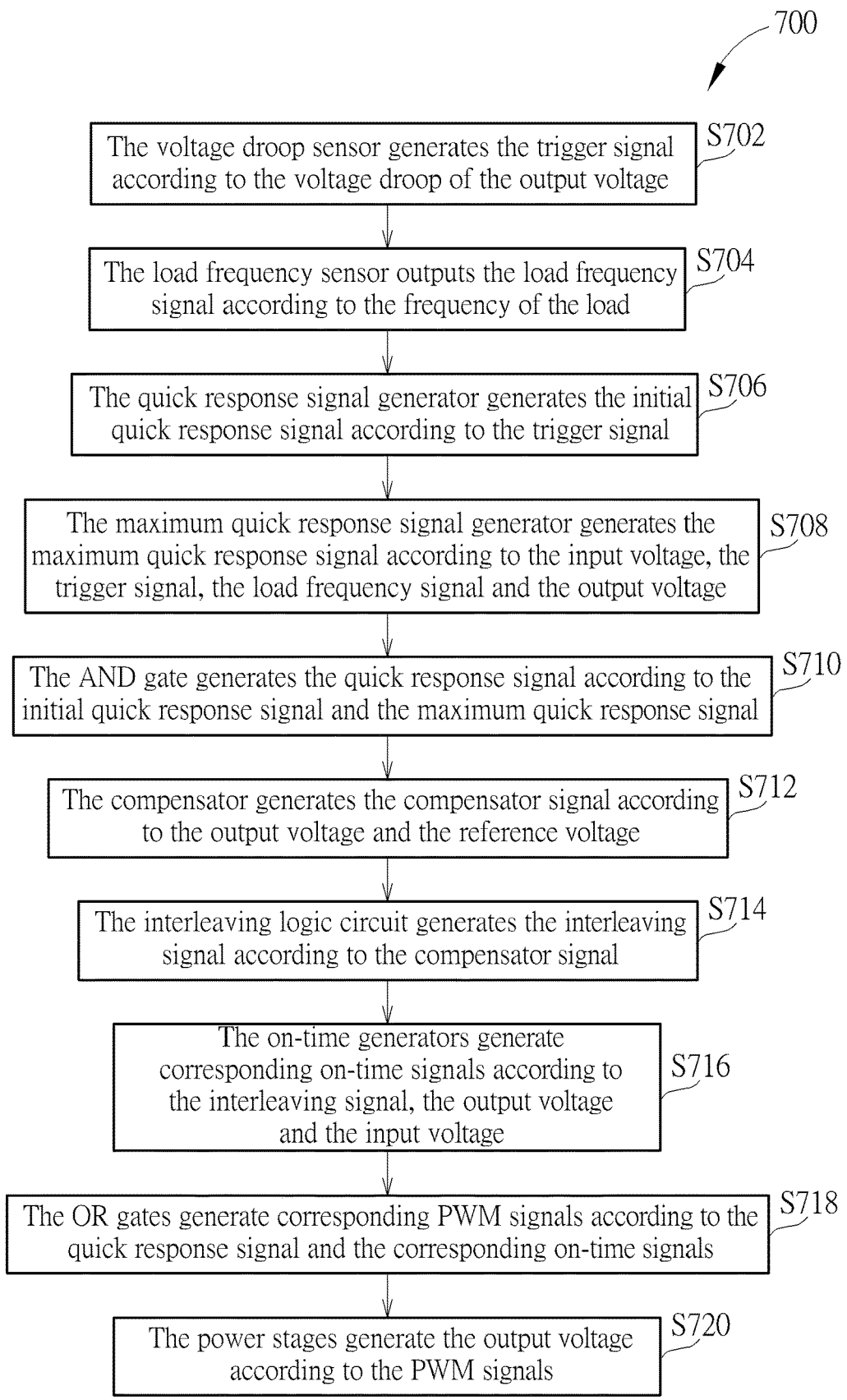
FIG. 7 is a flowchart of a method of operating the buck converter of FIG. 1.

FIG. 7 is a flowchart of a method 700 of operating the buck converter 100 of FIG. 1. The method 700 includes the following steps:

S702: The voltage droop sensor 12 generates the trigger signal Vsen according to the voltage droop of the output voltage Vo;

S704: The load frequency sensor 14 outputs the load frequency signal Fs according to the frequency of the load Lo;

S706: The quick response signal generator 16 generates the initial quick response signal QR1 according to the trigger signal Vsen;

S708: The maximum quick response signal generator 18 generates the maximum quick response signal QRmax according to the input voltage Vin, the trigger signal Vsen, the load frequency signal Fs and the output voltage Vo;

S710: The AND gate AND generates the quick response signal QR according to the initial quick response signal QR1 and the maximum quick response signal QRmax;

S712: The compensator 20 generates the compensator signal Vcomp according to the output voltage Vo and the reference voltage Vref;

S714: The interleaving logic circuit 30 generates the interleaving signal Vint according to the compensator signal Vcomp;

S716: The on-time generators Ton1 to TonN generate corresponding on-time signals PM1 to PMN according to the interleaving signal Vint, the output voltage Vo and the input voltage Vin;

S718: The OR gates OR1 to ORN generate corresponding PWM signals PWM1 to PWMN according to the quick response signal QR and the corresponding on-time signals PM1 to PMN; and S720: The power stages PS1 to PSN generate the output voltage Vo according to the PWM signals PWM1 to PWMN.

The details of the buck converter 100 can be found in the preceding paragraphs, and is not repeated herein.

Figure 8:
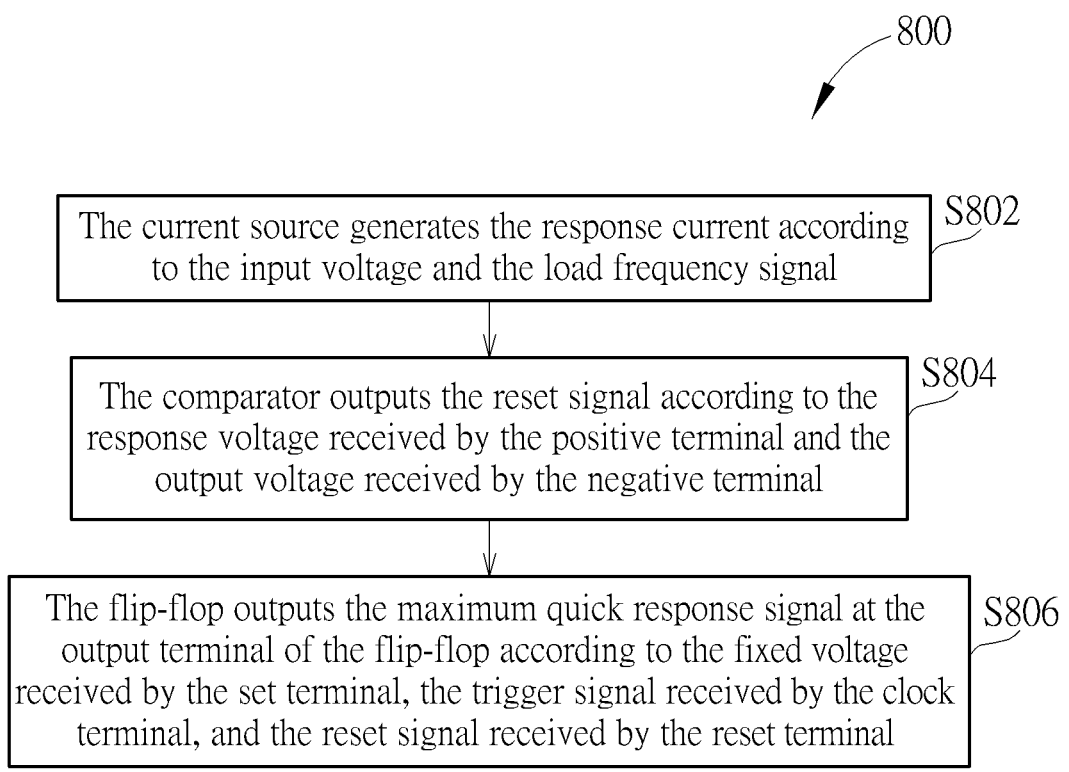
FIG. 8 is a flowchart of a method of operating the maximum quick response signal generator of FIG. 2.
Figure 9:
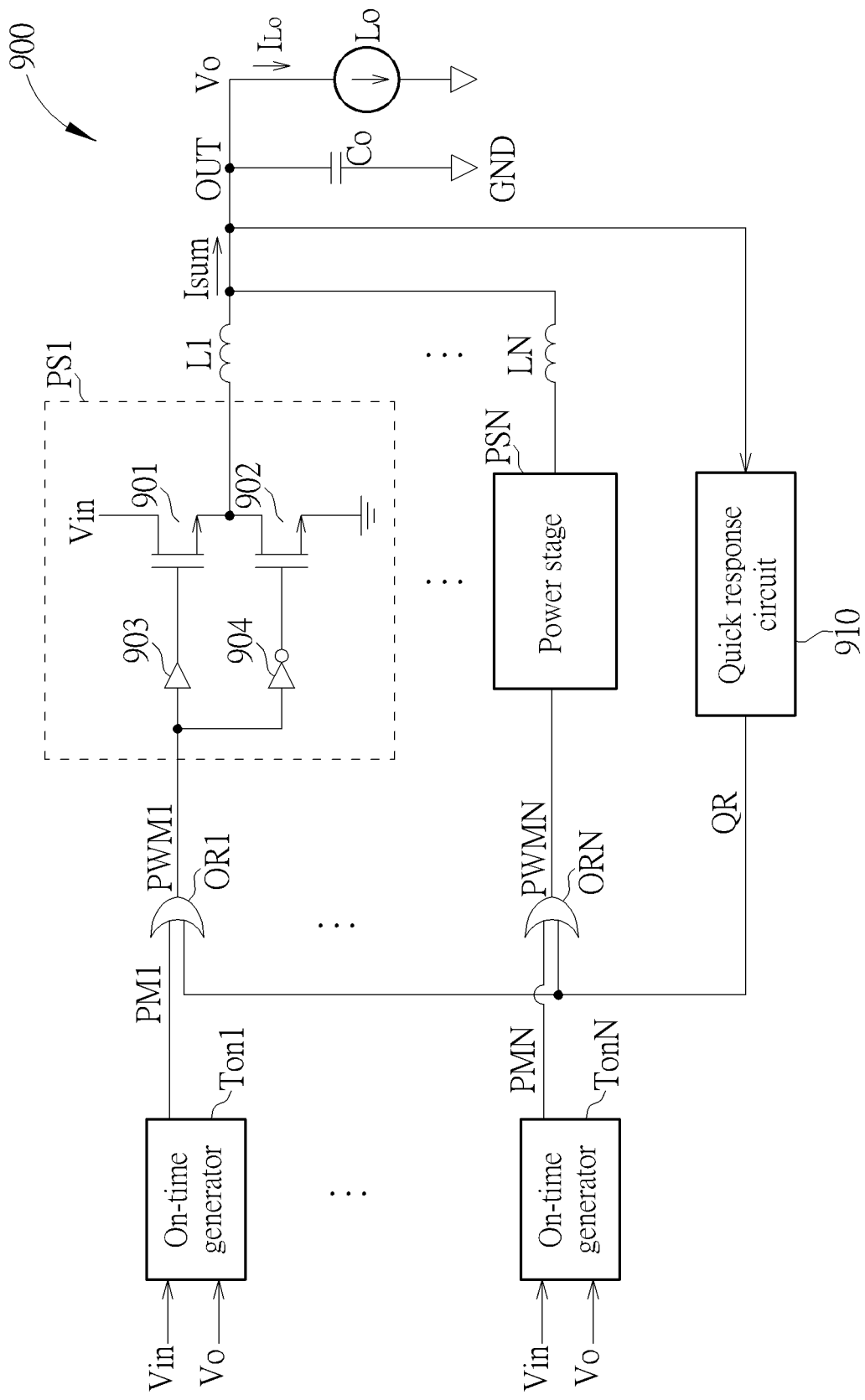
FIG. 9 is a diagram of a conventional buck converter with a quick response circuit.
Figure 10:
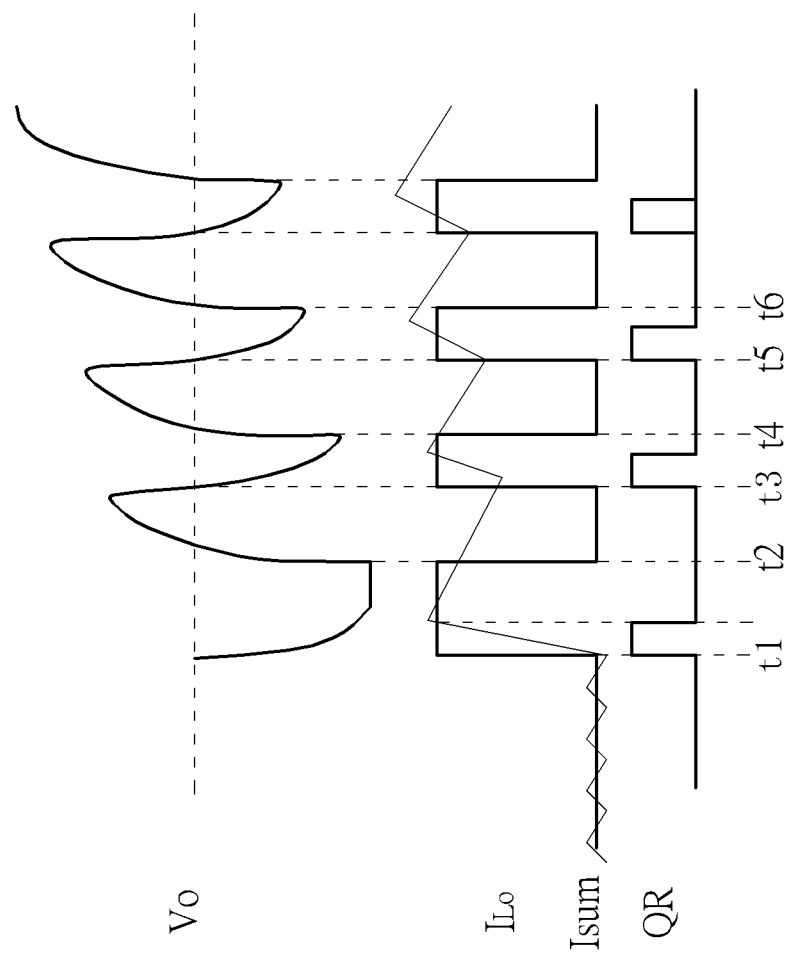
FIG. 10 is a timing diagram of operation signals of the buck converter of FIG. 9.

FIG. 8 is a flowchart of a method 800 of operating the maximum quick response signal generator 18 of FIG. 2. The method 800 includes the following steps:

S802: The current source 181 generates the response current Iqr according to the input voltage Vin and the load frequency signal Fs;

S804: The comparator 182 outputs the reset signal Vrst according to the response voltage Vqr received by the positive terminal and the output voltage Vo received by the negative terminal; and S806: The flip-flop FF outputs the maximum quick response signal QRmax at the output terminal Q of the flip-flop FF according to the fixed voltage VHD received by the data terminal D, the trigger signal Vsen received by the clock terminal CK, and the reset signal Vrst received by the reset terminal R.

The details of the maximum quick response signal generator 18 can be found in the preceding paragraphs, and is not repeated herein.

In summary, the buck converter with the quick response mechanism of the present invention can effectively avoid overvoltage problem that may be caused by the conventional quick response circuit during the transient period of load application. The total inductor current can be lowered to the original level before it is pulled high again, so there would not be additional energy buildup in the inductors. The output voltage is not pulled higher and higher over time, which avoids overvoltage and improves the energy efficiency of the buck converter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A buck converter, comprising:
   a quick response circuit, comprising:
      a voltage droop sensor coupled to an output terminal, and configured to detect a voltage droop of an output voltage and generate a trigger signal accordingly;
      a load frequency sensor coupled to the output terminal, and configured to detect a frequency of a load and output a load frequency signal accordingly;
      a quick response signal generator coupled to the voltage droop sensor, and configured to generate an initial quick response signal according to the trigger signal;
      a maximum quick response signal generator coupled to the voltage droop sensor, the load frequency sensor, the output terminal and an input terminal, and configured to generate a maximum quick response signal according to an input voltage, the trigger signal, the load frequency signal and the output voltage; and
      an AND gate coupled to the quick response signal generator and the maximum quick response signal generator, and configured to generate a quick response signal according to the initial quick response signal and the maximum quick response signal;
   a compensator coupled to the output terminal, and configured to generate a compensator signal according to the output voltage and a reference voltage;
   an interleaving logic circuit coupled to the compensator, and configured to generate an interleaving signal according to the compensator signal;
   a plurality of on-time generators each coupled to the interleaving logic circuit, the input terminal and the output terminal, and configured to generate an on-time signal according to the interleaving signal, the output voltage and the input voltage;
   a plurality of OR gates each coupled to the AND gate of the quick response circuit and a corresponding on-time generator, and configured to generate a PWM (pulse width modulation) signal according to the quick response signal and a corresponding on-time signal;
   a plurality of power stages each coupled to a corresponding OR gate, the plurality of power stages being configured to generate the output voltage according to a plurality of PWM signals generated by the plurality of OR gates;
   a plurality of inductors each coupled between a corresponding power stage and the output terminal; and
   an output capacitor coupled between the output terminal and a ground terminal.

2. The buck converter of claim 1, wherein the initial quick response signal, the maximum quick response signal, the quick response signal, the on-time signal, and the plurality of PWM signals are substantially square wave signals.

3. The buck converter of claim 1, wherein the plurality of on-time generators generate a plurality of on-time signals interleavingly or sequentially.

4. The buck converter of claim 1, wherein the quick response signal generator is further configured to adjust a width of the initial quick response signal according to a slope of the trigger signal.

5. The buck converter of claim 1, wherein the maximum quick response signal generator is further configured to adjust a width of the maximum quick response signal according to the input voltage, the output voltage and the load frequency signal.

6. The buck converter of claim 1, wherein the AND gate performs an AND operation on the maximum quick response signal and the initial quick response signal to generate the quick response signal.

7. The buck converter of claim 1, wherein each OR gate performs an OR operation on the quick response signal and the corresponding on-time signal to generate the PWM signal.

8. The buck converter of claim 1, wherein the compensator generates the compensator signal when the output voltage drops to be lower than the reference voltage.

9. The buck converter of claim 1, wherein the maximum quick response signal generator comprises:
   a current source configured to generate a current according to the input voltage and the load frequency signal;
   a capacitor coupled between the current source and the ground terminal;
   a switch comprising:
      a first terminal coupled to the current source and the capacitor;
      a second terminal coupled to the ground terminal; and
      a control terminal;
   a comparator configured to generate a reset signal according to
      a response voltage and the output voltage, the comparator comprising:
         a positive terminal coupled to the current source, the capacitor and the first terminal of the switch, and configured to receive the response voltage;
         a negative terminal configured to receive the output voltage; and an output terminal configured to output the reset signal; and a flip-flop configured to generate the maximum quick response signal according to a fixed voltage, the trigger signal and the reset signal, the flip-flop comprising:
a data terminal configured to receive the fixed voltage;
a reset terminal coupled to the output terminal of the comparator, and configured to receive the reset signal;
a clock terminal configured to receive the trigger signal;
an output terminal configured to output the maximum quick response signal; and
an inverse output terminal coupled to the control terminal of the switch.

10. A method of operating a buck converter, the buck converter comprising a quick response circuit, a compensator, an interleaving logic circuit, a plurality of on-time generators, a plurality of OR gates, a plurality of power stages, a plurality of inductors and an output capacitor, the compensator being coupled to an output terminal, the interleaving logic circuit being coupled to the compensator, the plurality of on-time generators each being coupled to the interleaving logic circuit, an input terminal and the output terminal, the plurality of OR gates each being coupled to a corresponding on-time generator, the plurality of power stages being coupled to the corresponding the plurality of OR gates, the plurality of inductors each coupled between a corresponding power stage and the output terminal, and an output capacitor being coupled between the output terminal and a ground terminal, the quick response circuit comprising a voltage droop sensor coupled to the output terminal, a load frequency sensor coupled to the output terminal, a quick response signal generator coupled to the voltage droop sensor, a maximum quick response generator coupled to the voltage droop sensor, the load frequency sensor, the output terminal and the input terminal, and an AND gate coupled to the quick response signal generator, the maximum quick response signal generator and the plurality of OR gates, the method comprising:
the voltage droop sensor generating a trigger signal according to a voltage droop of an output voltage;
the load frequency sensor outputting a load frequency signal according to a frequency of a load;
the quick response signal generator generating an initial quick response signal according to the trigger signal;
the maximum quick response signal generator generating a maximum quick response signal according to an input voltage, the trigger signal, the load frequency signal and the output voltage;
the AND gate generating a quick response signal according to the initial quick response signal and the maximum quick response signal;
the compensator generating a compensator signal according to the output voltage and a reference voltage;
the interleaving logic circuit generating an interleaving signal according to the compensator signal;
each of the plurality of on-time generators generating an on-time signal according to the interleaving signal, the output voltage and the input voltage;
each of the plurality of OR gates generating a PWM signal according to the quick response signal and a corresponding on-time signal; and
the plurality of power stages generating the output voltage according to a plurality of PWM signals generated by the plurality of OR gates.

11. The method of claim 10, wherein the initial quick response signal, the maximum quick response signal, the quick response signal, the on-time signal, and the plurality of PWM signals are substantially square wave signals.

12. The method of claim 10, wherein the quick response signal generator generating the initial quick response signal according to the trigger signal comprises:
the quick response signal generator adjusting a width of the initial quick response signal according to a slope of the trigger signal.

13. The method of claim 10, further comprising the plurality of on-time generators generating a plurality of on-time signals interleavingly or sequentially.

14. The method of claim 10, wherein the maximum quick response signal generator generating a maximum quick response signal according to the input voltage, the trigger signal, the load frequency signal and the output voltage, comprises:
the maximum quick response signal adjusting a width of the maximum quick response signal according to the input voltage, the output voltage and the load frequency signal.

15. The method of claim 10, wherein the AND gate generating the quick response signal according to the initial quick response signal and the maximum quick response signal, comprises:
the AND gate performing an AND operation on the maximum quick response signal and the initial quick response signal to generate the quick response signal.

16. The method of claim 10, wherein each of the plurality of OR gates generating the PWM signal according to the quick response signal and the corresponding on-time signal, comprises:
each OR gate performing an OR operation on the quick response signal and the corresponding on-time signal to generate the PWM signal.

17. The method of claim 10, wherein the compensator generating the compensator signal according to the output voltage and the reference voltage, comprises:
when the output voltage drops to be lower the reference voltage, the compensator generating the compensator signal.

18. The method of claim 10, wherein the maximum quick response signal generator comprises a current source, a capacitor, a switch, a comparator and a flip-flop, the capacitor is coupled between the current source and the ground terminal, the switch comprises a first terminal coupled to the current source and the capacitor, a second terminal coupled to the ground terminal, and a control terminal, the comparator comprises a positive terminal coupled to the current source, the capacitor and the first terminal of the switch, a negative terminal and an output terminal, the flip-flop comprises a data terminal, a reset terminal coupled to the output terminal of the comparator, a clock terminal, an output terminal and an inverse output terminal coupled to the control terminal of the switch, and the maximum quick response signal generator generating the maximum quick response signal according to the input voltage, the trigger signal, the load frequency signal and the output voltage comprises:
the current source generating a current according to the input voltage and the load frequency signal;
the comparator outputting a reset signal at the output terminal of the comparator according to a response voltage received by the positive terminal and the output voltage received by the negative terminal; and the flip-flop outputting the maximum quick response signal at the output terminal of the flip-flop according to a fixed voltage received by the data terminal, the trigger signal received by the clock terminal, and the reset signal received by the reset terminal.

19. A maximum quick response signal generator, comprising:
a current source configured to generate a current according to an input voltage and a load frequency signal;
a capacitor coupled between the current source and a ground terminal;
a switch comprising:
a first terminal coupled to the current source and the capacitor;
a second terminal coupled to the ground terminal; and
a control terminal;
a comparator configured to generate a reset signal according to a response voltage and an output voltage, the comparator comprising:
a positive terminal coupled to the current source, the capacitor and the first terminal of the switch, and configured to receive the response voltage;
a negative terminal configured to receive the output voltage; and
an output terminal configured to output the reset signal; and
a flip-flop configured to generate a maximum quick response signal according to a fixed voltage, a trigger signal and the reset signal, the flip-flop comprising:
a data terminal configured to receive the fixed voltage;
a reset terminal coupled to the output terminal of the comparator, and configured to receive the reset signal;
a clock terminal configured to receive the trigger signal;
an output terminal configured to output the maximum quick response signal; and
an inverse output terminal coupled to the control terminal of the switch.

20. A method of operating a maximum quick response signal generator, the maximum quick response signal generator comprising a current source, a capacitor, a switch, a comparator and a flip-flop, the capacitor being coupled between the current source and a ground terminal, the switch comprising a first terminal coupled to the current source and the capacitor, a second terminal coupled to the ground terminal, and a control terminal, the comparator comprising a positive terminal coupled to the current source, the capacitor and the first terminal of the switch, a negative terminal and an output terminal, the flip-flop comprising a data terminal, a reset terminal coupled to the output terminal of the comparator, a clock terminal, an output terminal and an inverse output terminal coupled to the control terminal of the switch, the method comprising:
the current source generating a current according to an input voltage and a load frequency signal;
the comparator outputting a reset signal at the output terminal of the comparator according to a response voltage received by the positive terminal and an output voltage received by the negative terminal; and
the flip-flop outputting the maximum quick response signal at the output terminal of the flip-flop according to a fixed voltage received by the data terminal, a trigger signal received by the clock terminal, and the reset signal received by the reset terminal.

* * * * *